United States Patent
Martinez et al.

(10) Patent No.: US 6,724,484 B2
(45) Date of Patent: Apr. 20, 2004

(54) FORMAT INSENSITIVE AND BIT RATE INDEPENDENT OPTICAL PREPROCESSOR

(75) Inventors: Julio Martinez, Oakhurst, NJ (US); Kwang Kim, Red Bank, NJ (US); Olga Nedzhvetskaya, Eatontown, NJ (US); Doruk Engin, Red Bank, NJ (US); Jiten Sarathy, Atlantic Highlands, NJ (US); Roman Antosik, Colts Neck, NJ (US); Bharat Dave, Howell, NJ (US); Michael Evans, Ocean, NJ (US); David Lidsky, Sea Bright, NJ (US); Ronald Simprini, Red Bank, NJ (US); Boris Stefanov, Gillette, NJ (US); Tan Thai, Jackson, NJ (US)

(73) Assignee: Alphion Corporation, Eatontown, NJ (US)

( * ) Notice: Subject to any disclaimer, the term of this patent is extended or adjusted under 35 U.S.C. 154(b) by 0 days.

(21) Appl. No.: 10/195,699

(22) Filed: Jul. 15, 2002

(65) Prior Publication Data

US 2002/0181085 A1 Dec. 5, 2002

Related U.S. Application Data

(62) Division of application No. 09/848,968, filed on May 4, 2001, now Pat. No. 6,570,697.

(51) Int. Cl.$^7$ .................................................. G01B 9/02
(52) U.S. Cl. ..................................................... 356/477
(58) Field of Search ............................... 359/450, 185; 356/477

(56) References Cited

U.S. PATENT DOCUMENTS 5,781,326 A * 7/1998 Chiaroni et al. ............ 359/237
6,366,382 B1 * 4/2002 Morthier et al. ............ 359/179
2002/0118441 A1 * 8/2002 Kang et al. .................. 359/333

FOREIGN PATENT DOCUMENTS

JP 2000010137 * 1/2000 ............. G02F/2/02

OTHER PUBLICATIONS van der Tol et al. Low–loss Integrated Optical Combiner based on Semiconductor Optical Amplifiers. Proceedings of the SAFE/IEEE Workshop. Nov. 29–30, 2000. pp. 149–152.*

Lee et al. Passive all optical non–return–to–zero to pseudo–return–to–zero signal conversion for all optical clock recovery. LEOS '96. Nov. 18–19, 1996. vol. 2. pp. 113–114.*

* cited by examiner

Primary Examiner—Thomas G. Black
Assistant Examiner—Deandra M. Hughes
(74) Attorney, Agent, or Firm—Kaplan & Gilman, LLP

(57) ABSTRACT

A method and circuit are presented for an all-optical format independent preprocessor that processes an arbitrary optical input signal by converting a NRZ signal to a PRZ signal, or if the input optical signal is RZ, by merely amplifying it. The method involves subtracting a delayed copy of the signal from the original, thereby effectively doubling its frequency, and inserting a pulse at each transition of the original signal, whether rising or falling. In a preferred embodiment this stage is implemented via an integrated SOA in each arm of an asymmetric interferometric device. The asymmetry consists of a delay element in one arm. In a preferred embodiment the entire device is fabricated on a semiconductor substrate, allowing for compactness as well as minimization of interconnectivity losses and overall power consumption. The output of the preprocessor, having a significant frequency component at its original clock rate, can then be fed to a clock recovery stage for all-optical clock recovery.

11 Claims, 4 Drawing Sheets

FORMAT INSENSITIVE AND BIT RATE INDEPENDENT OPTICAL PREPROCESSOR

RELATED APPLICATION

This is a divisional application of Ser. No. 09/848,968, now U.S. Pat. No. 6,570,697, filed May 4, 2001.

TECHNICAL FIELD

This invention relates to optical communications, and in particular to processing of arbitrary optical signals for inputting to all-optical clock recovery systems.

BACKGROUND OF THE INVENTION

Optical fiber networks, such as SONET, are in widespread use due to their ability to support high bandwidth connections. The bandwidth of optical fibers runs into gigabits and even terabits. Optical links can thus carry hundreds of thousands of communications channels multiplexed together.

As in all modem data networks, information is encoded as digital digits of "ones" or "zeros." There are various formats used to encode these digital bits as optical signals, depending on what type of pulse in the optical signal represents a "one" digit. Two of the most common formats are Return to Zero (RZ) and Non Return to Zero (NRZ). In the former, the second half of each bit is a zero, represented by no amplitude in the optical signal. Thus, each bit, no matter what its value, has the zero amplitude level for its second half (in the time domain, obviously). The latter format, NRZ, does not return to a zero amplitude level each bit. Thus a sequence of 100 "one" bits would be represented by holding the optical signal amplitude high for the time span of 100 bits. Only when the bit is actually a zero does the signal amplitude go low.

For obvious reasons, the non-return to zero format uses bandwidth more efficiently. The non-return to zero format is much more popular, and modem data networks tend to use a non-return to zero, or NRZ format.

The problem with NRZ format is that unless you know the inherent clock, it is very difficult to determine what the clock rate is of a given NRZ signal. This is because if you have a string of high, or "one" bits, the NRZ signal simply stays high; if you have a sequence of low bits, it simply stays low, there being no regular transitions. Thus, as an example, in NRZ format, three high bits followed by three low bits followed by three high bits followed by another three low bits could be read as either 111000111000, or as 1010, with a clock speed one third as fast as the first alternative.

Whatever method is devised to process an incoming signal so that it can be submitted to clock recovery analysis in the optical domain, that method must be able to preprocess the incoming optical signals regardless of not only what format (RZ or NRZ) they happen to be in, but it also must be insensitive to the bit rate they happen to be in. As is known, there are varying nominal bit rates supported in a network, such as, for example, 10 GHZ, 20 GHZ, 30 GHZ and 40 GHZ, as well as various modifications to same resulting in various actual bit rates. This is due to error correcting codes and similar format specific modifications to the bit rate which use extra, non-data, bits for various management functions.

As optical networks become increasingly transparent, there is a need to recover the line rate in the form of a clock signal without resulting to any optical to electrical and back to optical conversion of the signal as is commonly done in the art. As networks tend towards optical transparency, the nodal devices in the optical network must work with all supported line rates, independent of their format. One of the fundamental functions of these devices will be the capability to extract the clock from the signal in the optical domain. This depends on the signal's RF spectrum.

The RF spectrum of an RZ signal reveals a strong spectral component at the line rate. Consequently, the incoming RZ signal can be used directly to extract the clock signal. All that needs to be done with the incoming RZ signal is to amplify it. In the case of the NRZ signal format, the RF spectrum reveals no spectral component at the line rate, as described above. Thus, the RF spectrum of an ideal NRZ signal looks like a sinc function with the first zero at the line rate. Therefore, the fundamental problem of all optical clock recovery from NRZ signals is the generation in the signal of an RF spectral component at the line rate. Correlatively, the fundamental problem of all optical clock recovery from an arbitrary signal is the simple amplification of an RZ signal, and the conversion of an NRZ signal to one with a significant spectral component at the line rate.

The output of such processing can then be fed to clock recovery systems, which generally require an input signal with significant spectral component at the clock rate.

What is needed, therefore, to facilitate the next generation of transparent, all optical data networks, is a preprocessor which can take a given arbitrary optical signal, pass the signal with amplification if it is in RZ or other format with a large spectral component at the line rate, and take an incoming signal which does not have the large spectral component at the line rate and process it so that it does. All the processing that is to be done on the incoming arbitrary signal must only occur in the optical domain, so that optical-electrical-optical conversion, which is both costly and adds complexity, is not required.

SUMMARY OF THE INVENTION

A method and circuit are disclosed for the preprocessing of an arbitrary optical data signal for later use by a clock recovery system.

The method passes RZ signals with amplification, and converts incoming NRZ signals to Pseudo Return to Zero, or PRZ signals. PRZ signals have a strong spectral component at the line rate, and can be used by all optical clock recovery systems to lock onto that rate, thus generating an optical clock signal.

In a preferred embodiment, the method is implemented via a Semiconductor Optical Amplifier—Asymmetric Mach-Zehnder Interferometer, or SOA-AMZI, preprocessor, which, by controlling the SOAs in each arm, passes RZ signals with amplification, and converts NRZ signals to PRZ type signal, which has the requisite significant spectral component at the inherent clock rate.

The method is bit rate independent.

In an alternative embodiment, the preprocessor is implemented using a multi-mode coupler interferometer (MMCI). An exemplary SOA device for use in implementing the various circuits is also disclosed. Using such a SOA device, the entire preprocessor can be integrated on a single chip, thus facilitating all-optical integrated circuit network nodal processing functionalities.

DETAILED DESCRIPTION OF THE PREFERRED EMBODIMENTS

The above described and other problems in the prior art are solved in accordance with the method, apparatus, circuit and devices of the present invention, as will now be described.

Most, if not all, optical networks currently operating transmit some or all data as NRZ signals. In the case of the NRZ signal format, the RF spectrum reveals no spectral component at the line rate. This is a simple consequence of the format. The RF spectrum of an ideal NRZ signal looks like the mathematical sinc function with the first zero at the line rate.

On the other hand, the RF spectrum of an RZ signal reveals a strong spectral component at the line rate. Consequently, an incoming RZ signal can be operated upon directly to extract the clock signal.

The fundamental problem of all-optical clock recovery from an arbitrary incoming optical signal is thus the passing of an RZ signal without attenuation, and the generation of a RF spectral component at the line rate for a NRZ signal. For an NRZ signal of unknown bit rate and format, an NRZ/PRZ converter is used to generate this latter spectral component by converting the incoming NRZ into a pseudo return to zero, or PRZ signal.

Although for illustrative purposes NRZ to PRZ conversion has been described, in general any bit representation schema that does not contain a significant RF spectral component at the line rate—i.e. where the recipient needs to know a priori what the line rate is so as to delineate each bit from its neighbors—can be converted to one that has such a component by the method of the present invention. The method simply exploits the fact that over the long run the transitions from ones to zeros are numerous enough to allow the creation of a signal with significant clock rate frequency component.

Once the incoming signal has a significant spectral component at the line rate, optical oscillations, for example, can be triggered, by an optical clock recovery system, to obtain a pure line rate optical clock signal.

Figure 1:
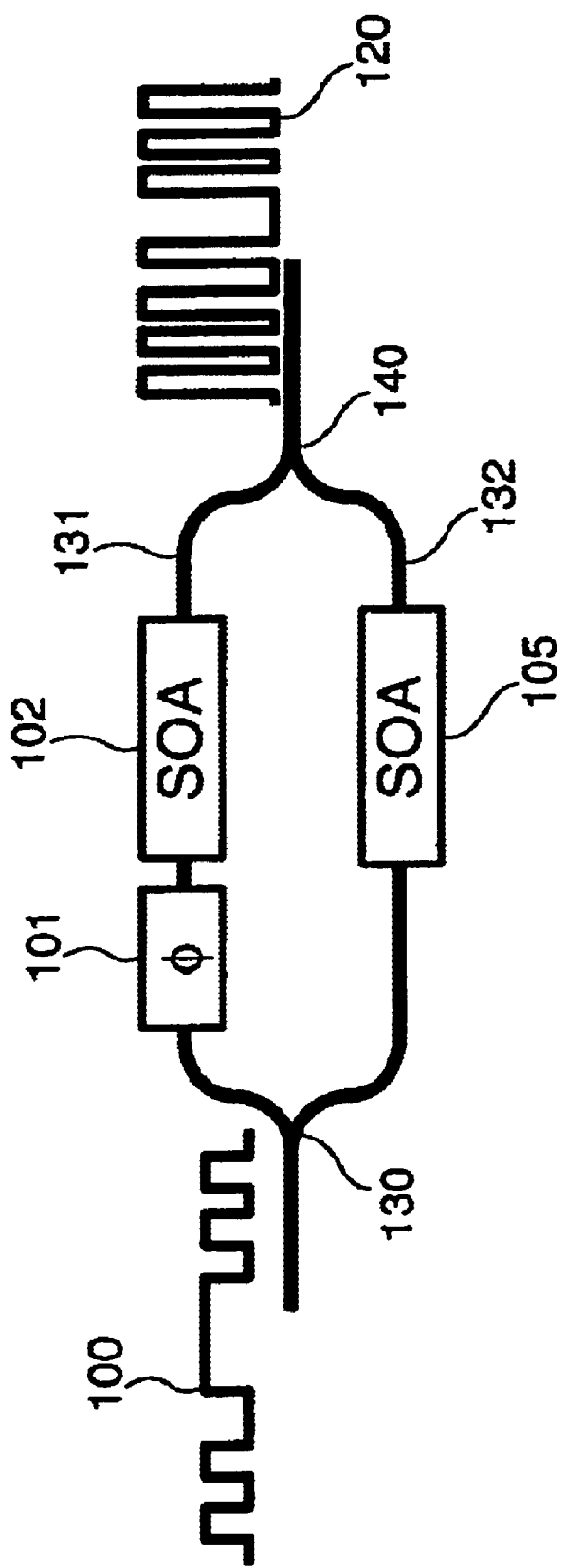
FIG. 1 depicts a circuit implementing the method of the present invention.

FIG. 1 depicts an optical circuit implementing the method of the present invention. It consists of an input signal 100, which splits into two paths at point 130 via an interferomemter. In a preferred embodiment the 50/50 splitter will send one half of the power to each inteferometer arm, although other ratios are possible and advantageous in certain contexts, and thus contemplated within the method of the invention.

The two signals pass through the arms of the interferometer, which are not identical. The upper arm has a phase delay element 101, which can be implemented via a lengthening of the waveguide 131, or via a specialized piezoelectric device. The interferometer is set for destructive interference, and recombined at coupler 140. Thus the output 120 of this circuit will have a pulse wherever a transition, either low to high or high to low, occurred in the original signal. Each arm has an optical amplifier in the signal path as well, for reasons to be discussed after the illustration of the method of the NRZ to PRZ conversion.

Thus, the interference of a high bit with its path delayed and phase inverted copy, generates an RZ-like bit at both the leading and falling edges of the original high bit. This latter signal, with a bit rate effectively double that of the original NRZ bit rate, is the PRZ output signal 120.

This effective doubling of the bit rate leads to the generation of a large component of the line rate frequency in the RF spectrum of the output signal 120 of the AMZI. Generally, unless the input signal is exceptionally aberrant, this line rate frequency will be the far and away dominant frequency in the spectrum. Since the preprocessor does not need to know the actual bit rate or format of the input data, it is data rate and format insensitive.

Figure 2:
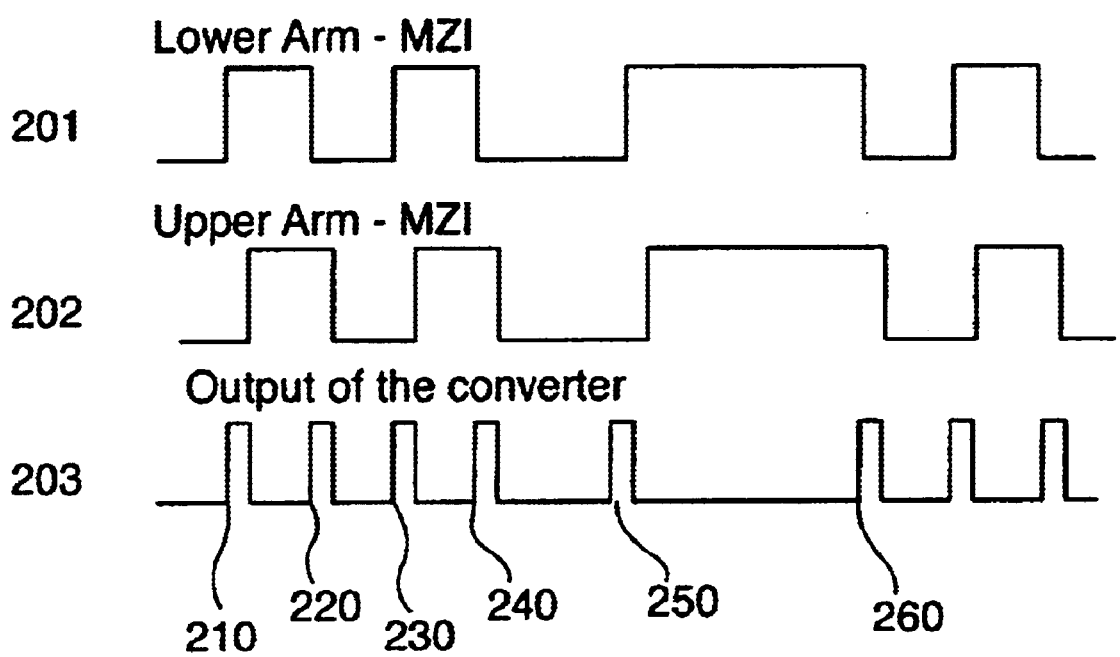
FIG. 2 illustrates the method of NRZ to PRZ conversion.

FIG. 2 illustrates the above described method. Signal 201 is the signal traveling through the lower arm of the interferometer. It has the same form as the NRZ input signal, less the power fraction lost at the splitter 130. Signal 202 is the delayed signal generated in the upper arm of the interferometer, delayed approximately 25% of the NRZ bit width at a data rate of 10 Gbits/sec. This delay will vary for higher bit-rate signals. Thus when signals 210 and 202 are destructively combined, the output signal 203 has an appropriate pulse width. The required power of the pulses (as determined by the clock recovery system to which this output signal 203 is input) is adjusted via the gain control of the SOAs. In the example shown in FIG. 2, the output pulse width is approximately 25% of the NRZ pulse width (thus roughly equal to the percentage delay) and an output pulse is generated wherever the original signal transitioned.

In order to achieve true bit rate independence, the preprocessor must be able to handle any of the bit rates used in the network. Say, for example, this includes a bit rate spectrum of 10 Gbits/second to 40 Gbits/second. Since the interferometer of an optical circuit such as depicted in FIG. 1 cannot have the length of any of its arms dynamically lengthened or shortened, nor can a piezoelectric delay element be dynamically controlled to vary the delay, the delay is fixed, and must support all bit rates. Thus, one generally designs the circuit of FIG. 1 to have a delay long enough to cause a substantial overlap at all supported bit rates, given the fact that a fixed differential waveguide length between the two arms of the interferometer produces a different output pulse width at different bit rates.

One possible method of doing this is to set the overlap between the original signal and the delayed version (determined by the delay of the upper AMZI arm relative to the lower AMZI arm) at the lowest supported bit rate high enough, such that at the highest supported bit rate the output PRZ pulse widths are still wide enough, given the signal power amplification possible via the SOAs, to drive the clock recovery system. (The absolute theoretical maximum delay being some delay close to, but distinguishably less than, 100% of the NRZ pulse width, thus the fixed delay cannot be so large so as to be greater than 100% at the highest supported bit rate). The longer the AMZI upper arm delay, the wider the pulses in the PRZ output, as is evident from FIG. 2. However, as the bit rates rise, the overlap, and thus the pulse width of the PRZ signal at that bit rate, will be substantially less than that for the lowest bit rate (since the delay time is absolute, but the pulse widths are shorter in the time domain as the bit rate increases), and will thus require more amplification from the SOAs.

It is understood that different patterns in the NRZ input signal experienced in any given network at any particular time may result in output signal variation; ongoing monitoring of the quality of the output signal 203 in terms of its ability to properly drive a given clock recovery system may be required, and use of an AMZI with a slightly different fixed upper arm delay may be useful. Where the spectrum of supported bit rates is very wide, or significant aberrant input signals, for whatever reason, are received, the method of the invention may be extended to an array of AMZIs. In such a topology an optical switching mechanism would be utilized to switch the optical signal input path between two or more AMZIs in the array, each having a slightly different upper arm fixed delay. The switch would be under control of a sensing device, which would categorize an input signal as being in a particular sub band (determined by bit rate and/or other factors) most optimally serviced by an AMZI with a particular fixed delay. Alternatively, an optical device with a variable delay element, as may become available in the art, could be used, its delay being controlled as a function of the input signal.

As an illustrative example, for a 10 Gbit/s NRZ original signal, the bit width is $1/(10*10^9)$ sec, or 100 picoseconds. Assuming the same network also supports 40 GHz signals, the NRZ pulse width at that 40 Gbit/s rate is now only 25 picoseconds. Setting a 50% delay at 40 Gbit/second, or a fixed delay of 12.5 picoseconds, results in only a 12.5% pulse width overlap at 10 Gbit/second. Alternatively, setting a fixed delay in the AMZI of 20 picoseconds results in a 20% overlap at 10 Gbit/s and a thus a 20 picosecond PRZ output pulse width. However, the same delay at 40 GHz is some 80% of the pulse width, making thicker pulses in the PRZ signal at 40 GHz. If smaller overlaps are used, the pulse width power can be amplified by increasing the gain of the SOAs.

Thus, the use of dynamically controllable SOAs facilitates the bit rate insensitivity of the device notwithstanding a fixed delay element in the interferometer. The use of the SOA-AMZI also allows the input power required by subsequent devices in the signal path, such as the clock recovery system to be quite nominal; thus signal pre-amplification concerns are diminished or avoided.

Multimode Interference (MMI) couplers with a 50:50 splitting ratio (commonly known as 3 dB couplers) make up the couplers of the device 310 and 311, respectively.

The SOAs are dynamically controlled via feedback from the clock recovery system to increase gain as necessary for lower bit rate signals so as to keep the optical clock signal robust. Such feedback mechanisms are generally known in the art, and not further described herein. Additionally, if the incoming signal is sensed to be in RZ format, then the gain of the upper arm SOA is set to zero, and that of the lower arm to double its normal gain. Thus, in such case, the RZ signal is simply passed and amplified. Sensing of RZ vs. NRZ formats is generally known in the art, and can be via a priori communication from a user in a packet header or frame header, or can be gleaned from an arbitrary signal by means of specialized circuitry.

The method of the invention can be implemented using either discrete components, or, in a preferred embodiment, as an integrated device in InP-based semiconductors. The latter embodiment will next be described with reference to FIGS. 3 and 4.

Figure 3:
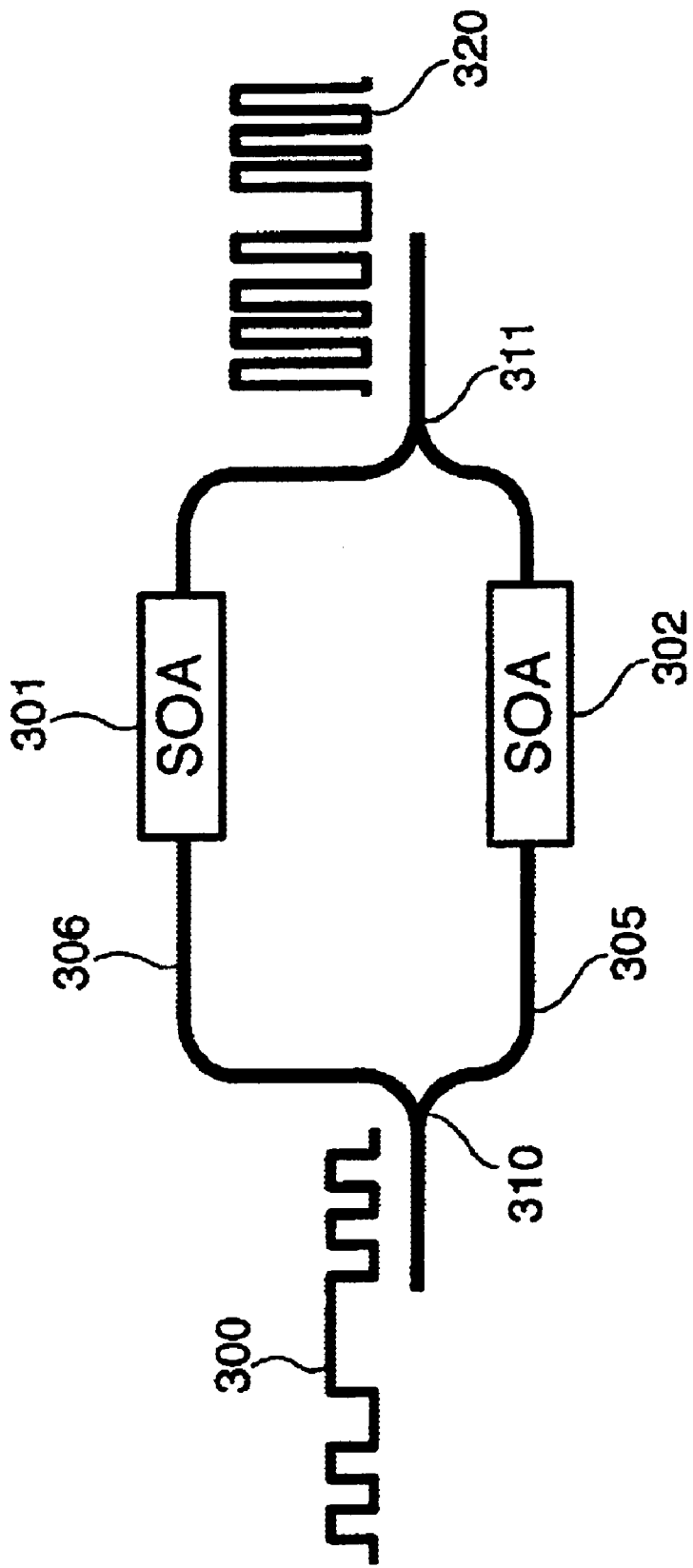
FIG. 3 depicts a preferred embodiment of the circuit of FIG. 1.

FIG. 3 is the preferred embodiment integrated circuit version of the circuit of FIG. 1. The delay is achieved by lengthening the waveguide in the upper arm 306 of the interferometer. As before, the NRZ input signal is split at coupler 310 into two parts. One travels on the lower arm, and is amplified. The other travels on the upper arm and is amplified, as well as delayed by the longer path length. The signals are recoupled at the coupler 311, and the destructive interference results in the PRZ output signal 320.

Figure 4:
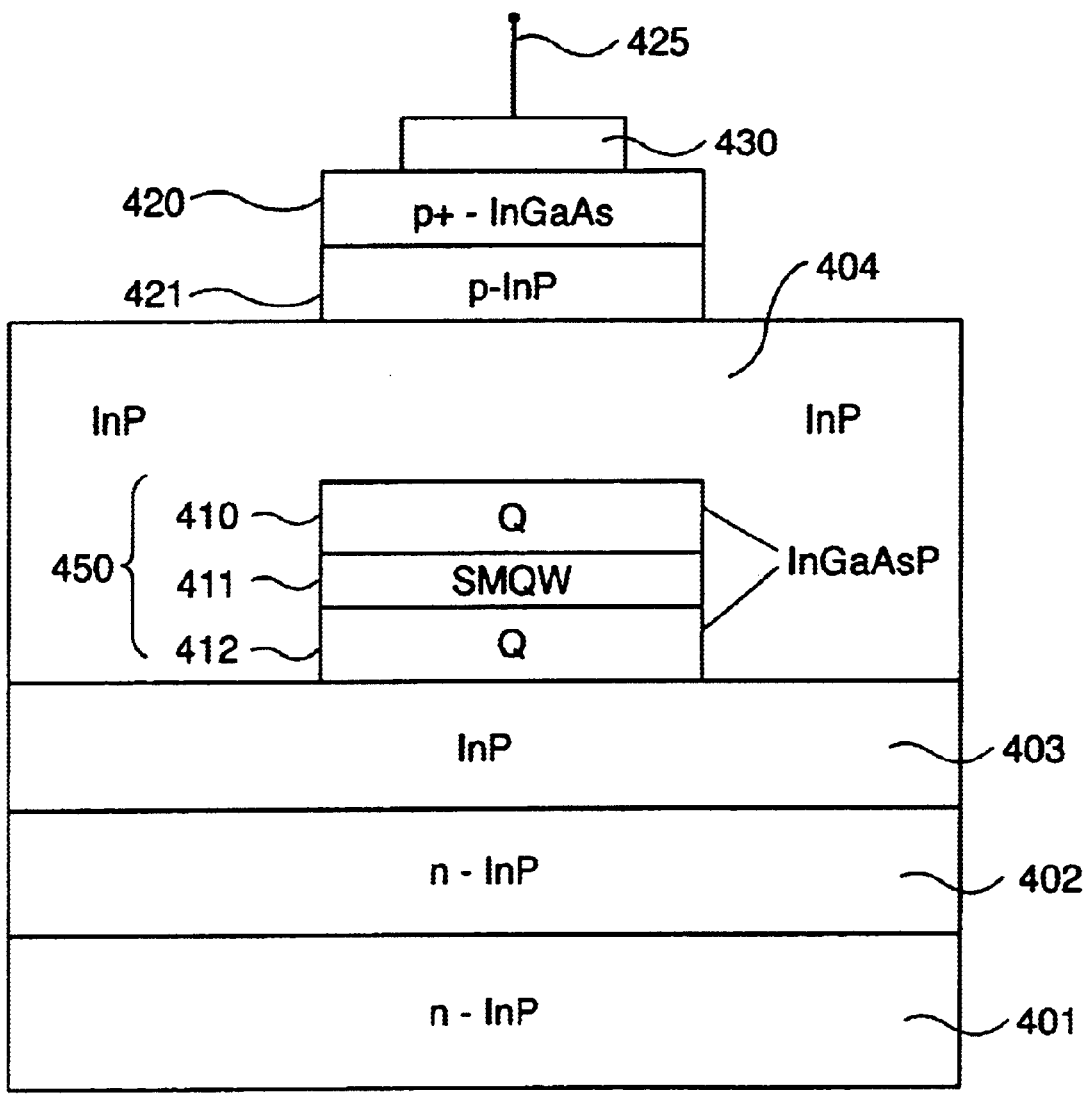
FIG. 4 depicts an exemplary semiconductor optical amplifier device used according to the method of the present invention.

FIG. 4 depicts a cross section of an exemplary integrated circuit SOA. With reference to FIG. 1, FIG. 4 depicts a cross section of any of the depicted SOAs taken perpendicular to the direction of optical signal flow in the interferometer arms. Numerous devices of the type depicted in FIG. 4 can easily be integrated with the interferometers of the preprocessor, so that the entire circuit can be fabricated on one IC. The device consists of a buried sandwich structure 450 with an active Strained Multiple Quantum Well region 411 sandwiched between two waveguide layers 410 and 412 made of InGaAsP. The sandwich structure does not extend laterally along the width of the device, but rather is also surrounded on each side by the InP region 404 in which it is buried.

The active Strained MQW layer is used to insure a constant gain and phase characteristic for the SOA, independent of the polarization of the input signal polarization. The SMQW layer is made up of pairs of InGaAsP and InGaAs layers, one disposed on top of the other such that there is strain between layer interfaces, as is known in the art. In a preferred embodiment, there are three such pairs, for a total of six layers. The active region/waveguide sandwich structure 450 is buried in an undoped InP layer 404, and is laterally disposed above an undoped InP layer 403. This latter layer 403 is laterally disposed above an n-type IP layer 402 which is grown on top of a substantially doped n-type InP substrate. The substrate layer 401 has, in a preferred embodiment, a doping of $4$–$6 \times 10^{18}/\text{cm}^{-3}$. The doping of the grown layer 402 is precisely controlled, and in a preferred embodiment is on the order of $5 \times 10^{18}/\text{cm}^{-3}$. On top of the buried active region/waveguide sandwich structure 450 and the undoped InP layer covering it 404 is a laterally disposed p-type InP region 421. In a preferred embodiment this region will have a doping of $5 \times 10^{17}/\text{cm}^{-3}$. On top of the p-type InP region 421 is a highly doped p+-type InGaAs layer. In a preferred embodiment this latter region will have a doping of $1 \times 10^{19}/\text{cm}^{-3}$. The p-type layers 420 and 421, respectively, have a width equal to that of the active region/waveguide sandwich structure, as shown in FIG. 4.

As described above, the optical signal path is perpendicular to and heading into the plane of FIG. 4.

As discussed above, utilizing the SOA described above, the optical preprocessor can be integrated in one circuit. An exemplary method of effecting this integration is next described.

After an epiwafer is grown with the waveguides and the SOA active region, the wafer is patterned to delineate the SOAs, and the AMZI. In a preferred embodiment the path length difference between the two arms of the AMZI is approximately 1 mm.

The top cladding layer (undoped InP), the p-type InP layers and the contact layer are then regrown on the patterned substrate. This step is then followed by photolithography for top-contact metallization. The device is then cleaved and packaged.

The disclosed preprocessor can serve as a pre stage of an All Optical Clock Recovery ("AOCR") scheme. Thus the entire circuit can itself be integrated on a larger chip with such clock recovery, and other (such as all optical regeneration, reshaping and retiming) integrated functionalities.

While the above describes the preferred embodiments of the invention, various modifications or additions will be apparent to those of skill in the art. Such modifications and additions are intended to be covered by the following claims.

What is claimed:

1. A method, comprising:

processing an optical signal in NRZ format so as to cause it to have a high spectral component at its original clock frequency by dividing the optical signal into two segmental signals, applying a variable phase delay to a first segmental signal, amplifying each of the segmental signals by an optical amplifier and recombining the amplified segmental signals in a destructive interference.

wherein said optical amplifier is a semiconductor device comprising:

an InP substrate of a first doping type;

a first InP layer of the first doping type disposed on said InP substrate;

a second InP layer of the first doping type disposed upon on said InP layer;

A first InGaAsP waveguide region laterally disposed on said second InP layer of the first doping type, said first InGaAsP waveguide region having a width less than that of the first InP substrate of the first doping type, first InP layer of the first doping type and second InP layer of the first doping type;

an active strained multiple quantum well region laterally disposed on top of said first waveguide region, having essentially the same width as said first waveguide region;

a second InGaAsP waveguide region laterally disposed on top of said strained multiple quantum well region, having essentially the same width as said first waveguide region;

a third InP layer of the first doping type, laterally disposed on top of said second waveguide region, and extending downward, in the direction of said substrate along the sides of said active region and said first waveguide region, having a width essentially equal to the substrate and the first InP layer of the first doping type and second InP layers of the fist doping type;

a first InP layer of a second doping type laterally disposed above said third InP layer of the first doping type, having essentially the same width as said first waveguide region and as said strained multiple quantum well region;

a second InP layer of a second doping type laterally disposed on said first InP layer of the second doping type, having essentially the same width as said first InP layer of the second doping type;

a contact layer laterally disposed above said second InP layer of the second doping type; and a metal electrode disposed above said contact layer.

2. The method of claim 1, wherein said amplifying of the first segmental signal and the second segmental signal are carried out in a pair of arms of an interferometer.

3. The method of claim 2, wherein said of applying a phase delay to the first segmental signal is carried out in one of said two arms of the interferometer.

4. The method of claim 2, wherein the amplification is done via an SOA in each arm of the interferometer.

5. The method of claim 4, wherein the Interferometer is a Mach-Zehnder interferometer.

6. The method of claim 1, wherein the step of amplifying comprises dynamically controllably amplifying.

7. A method for processing a single optical signal in NRZ format in an all-optical clock recovery system to have a high spectral content, comprising the steps of:

(a) splitting the single optical signal into a first and a second branch signal;

(b) amplifying the first branch signal and the second branch signal, each by an optical amplifier;

(c) applying a phase delay to said first branch signal; and (d) combining the amplified and phase-delayed first branch signal and the amplified second branch signal to produce a destructively interfered resultant single optical signal, wherein said optical amplifier is a semiconductor device comprising:

an InP substrate of a first doping type;

a first InP layer of the first doping type disposed on said InP substrate;

a second InP layer of the first doping type disposed upon said first InP layer;

a first InGaAsP waveguide region laterally disposed on said second InP layer of the first doping type, said first InGaAsP waveguide region having a width less than that of the first InP substrate of the first doping type, first InP layer of the first doping type and second InP layer of the first doping type;

an active strained multiple quantum well region laterally disposed on top of said first waveguide region, having essentially the same width as said first waveguide region;

a second InGaAsP waveguide region laterally disposed on top of said strained multiple quantum well region, having essentially the same width as said first waveguide region;

a third InP layer of the first doping type, laterally disposed on top of said second waveguide region, and extending downward in the direction of said substrate along the sides of said active region and said first waveguide region, having a width essentially equal to the substrate, and the first InP layer of the first doping type and second InP layers of the first doping type;

a first InP layer of a second doping type, laterally disposed above said third InP layer of the first doping type, having essentially the same width as said first waveguide region and as said strained multiple quantum well region;

a second InP layer of the second doping type laterally disposed on said first InP layer of the second doping type having essentially the same width as said first InP layer of the second doping type;

a contact layer laterally disposed above said second InP layer of the second doping type; and a metal electrode disposed above said contact layer.

8. The method of claim 7, wherein the step of amplifying comprises dynamically controlling an SOA applied to each branch signal.

9. The method of claim 7, wherein said applying a phase delay to the first branch signal is carried out prior to amplifying the first branch signal.

10. The method of claim 7, wherein the first branch signal and the second branch signal are combined in an interferometer.

11. The method of claim 7, wherein the interferometer is a Mach-Zehnder interferometer.

* * * * *